US 6,649,221 B1

(12) United States Patent
Tateno et al.

(10) Patent No.: US 6,649,221 B1
(45) Date of Patent: Nov. 18, 2003

(54) SPACER MICROPARTICLE SPRAYING APPARATUS AND METHOD FOR FABRICATING A LIQUID CRYSTAL DISPLAY

(75) Inventors: Akihiko Tateno, Kyoto (JP); Hiroyuki Nakatani, Kyoto (JP); Kazuya Yoshimura, Osaka (JP); Makoto Nakahara, Osaka (JP); Takatoshi Kira, Osaka (JP); Daisuke Ikesugi, Osaka (JP); Masaki Ban, Iruma-gunitama (JP); Hiroshi Murata, Tokyo (JP); Masaaki Kubo, Tokyo (JP)

(73) Assignees: Sekisui Chemical Co., Ltd., Osaka (JP); Sharp Kabushiki Kaisha, Osaka (JP); Nisshin Engineering, Inc., Tokyo (JP)

( * ) Notice: Subject to any disclaimer, the term of this patent is extended or adjusted under 35 U.S.C. 154(b) by 0 days.

(21) Appl. No.: 09/530,223

(22) PCT Filed: Oct. 27, 1998

(86) PCT No.: PCT/JP98/04846

§ 371 (c)(1),
(2), (4) Date: Jun. 21, 2000

(87) PCT Pub. No.: WO99/22269

PCT Pub. Date: May 6, 1999

(30) Foreign Application Priority Data

| Oct. 27, 1997 | (JP) | 9/294370 |
| Dec. 16, 1997 | (JP) | 9/346384 |
| Mar. 4, 1998 | (JP) | 10/52160 |

(51) Int. Cl.[7] .................. B05D 1/06; B05C 19/04
(52) U.S. Cl. .................. 427/469; 427/466; 427/475; 427/485; 118/625; 118/629

(58) Field of Search .................. 427/475, 485, 427/486, 466, 469; 118/625–627, 629, 634, 638

(56) References Cited

U.S. PATENT DOCUMENTS 4,961,962 A * 10/1990 Morimoto
6,190,456 B1 * 2/2001 Matsuda

FOREIGN PATENT DOCUMENTS

| JP | 59-150760 | * 8/1984 |
| JP | 5-66407 | * 3/1993 |

* cited by examiner

Primary Examiner—Fred J. Parker
(74) Attorney, Agent, or Firm—Connolly Bove Lodge & Hutz LLP

(57) ABSTRACT

Provided is a spacer microparticle spraying apparatus capable of selectively disposing spacer microparticles in electrode gaps where no pixels are present even on a substrate carrying an array of stripe electrodes in use for the STN liquid crystal display device, to a spacer particle spraying method and a method of manufacturing a liquid crystal display device which utilize said apparatus. The spacer microparticle spraying apparatus for selective disposition of a charged spacer microparticle on a substrate carrying a plurality of electrodes includes a spraying chamber adapted to accommodate the substrate, a spacer microparticle supply means for supplying the spacer microparticle into the spraying chamber and spraying it on the substrate, and a voltage application means for applying voltages to the electrodes disposed on the substrate, wherein the voltage application means is capable of applying different levels of voltages to the electrodes respectively.

22 Claims, 9 Drawing Sheets

Region with a relatively high level of voltage

Electrode 3

Substrate 1

Region with a relatively low level of voltage

Region with a relatively low level of voltage   Region with a relatively high level of voltage Relative voltage : + + − − + + − − + + − − · · · · ·

SPACER MICROPARTICLE SPRAYING APPARATUS AND METHOD FOR FABRICATING A LIQUID CRYSTAL DISPLAY

TECHNICAL FIELD

The present invention relates to a microparticle spraying apparatus and to a microparticle spraying method and a method of manufacturing a liquid crystal display device, which utilize said apparatus.

BACKGROUND ART

With advances in electronics, microfine microparticles are used in a variety of applications. Among such microparticles are electrically conductive microparticles in use in anisotropic films, conductive microparticles in use in the field of bonding technology, and microparticles applied as spacers in liquid crystal display devices.

As one of the applications of such microparticles, the liquid crystal display devices have been broadly used in personal computers and portable electronic appliances. The liquid crystal display device generally comprises a pair of substrates 1, a liquid crystal layer 7 sandwiched therebetween, a color filter layer 4, a black matrix layer 5, a transparent electrode layer 3, alignment layers 9, etc. as illustrated in FIG. 12. Here, it is a spacer layer 8 that defines the interval of two substrates 1, i.e. the proper thickness of the liquid crystal layer.

In the conventional method of manufacturing a liquid crystal display device which comprises spraying spacer microparticles randomly and uniformly over a substrate carrying pixel electrodes, the spacer microparticles are inevitably disposed as well on the pixel electrodes, i.e. the display areas of the liquid crystal display, as can be seen from FIG. 12, with the result that the aperture rate is substantially decreased. The spacer microparticles are generally composed of synthetic resin, glass or the like and when the spacer is disposed on pixel electrodes, light leaks occur in the spacer region owing to a depolarization effect. In addition, the orientation of liquid crystals on the spacer surface is disturbed to cause escape of light, resulting in decreases in contrast and tone to aggravate the display quality.

In order to overcome the above disadvantages, the spacer microparticles should be disposed exclusively in the light-shielding black matrix areas formed in the color filter layer. The black matrix layer is provided for improved contrast of display in the liquid crystal display device and, in the case of a TFT liquid crystal device, for preventing the optically erratic action of the cell due to external light.

As the technology directed to disposing a spacer selectively in the black matrix areas, i.e. in the areas other than pixel electrodes of a liquid crystal display device, Japanese Kokai Publication Hei-4-256925 discloses a method which comprises holding the gate electrode group and drain electrode group at the same electric potential during application of the spacer microparticles. Japanese Kokai Publication Hei-5-53121 discloses a method which comprises applying a voltage to the wiring electrodes during application of the spacer microparticles. Moreover, Japanese Kokai Publication Hei-5-61052 discloses a dry microparticle spraying method which comprises applying a positive voltage to the wiring electrodes and a negative charge to the spacer microparticles.

However, any method as mentioned above invariably depends on the use of wiring electrodes and, therefore, are only applicable to TFT liquid crystal display devices. In STN liquid crystal display devices, there are no electrodes corresponding to said wiring electrodes but stripe electrodes are disposed in orthogonal relation between the two substrates to form pixel electrodes, with the areas corresponding to the black matrix forming the electrode gaps (spaces), with the result that the above technologies cannot be utilized.

Meanwhile, Japanese Kokai Publication Hei-4-204417 discloses a technology wherein the spacer is selectively disposed in the electrode-free areas by charging the electrodes on one of the insulating substrates and spraying the spacer charged to the same polarity as the electrodes over the insulating substrate and, in addition, a conductor is disposed under the electrode substrate in a microparticle spraying apparatus so that a plus voltage may be applied so as to control the falling speed of the negatively charged spacer while the housing comprises a conductive material to which a minus voltage may be applied for avoiding attraction of the negatively charged spacer microparticles to the apparatus wall.

However, there is some variation in the charging amount of the spacer due to the intrinsic variation of the spacer material itself, with a portion of the spacer being charged to the opposite polarity, and such reversely (positively) charged spacer microparticles are disposed on the electrodes (which are negatively charged) on the insulating substrate to substantially reduce the aperture rate.

Japanese Kokai Publication Sho-63-77025 discloses a spacer spraying apparatus wherein the ceiling and bottom of the apparatus are constituted as a pair of electrodes so that an electric field may be generated by applying a direct-current voltage across said ceiling and bottom and the spacer equalized to the ceiling in electric potential is sprayed. Because, with this apparatus, the spacer is caused to fall through the electric field, the falling speed of the spacer can be controlled so that the spacer microparticles can be uniformly dispersed and deposited on a substrate.

However, with this spacer spraying apparatus, the falling speed of spacer microparticles can be controlled in some measure by exploiting the influence of an electric field but since lines of electric force are formed between the top and bottom electrodes, selective control of spacer falling position is difficult. Moreover, when a voltage is applied to the stripe electrode array for use as bottom electrodes, no selectivity is obtained but a uniform electric field prevails because of the narrow electrode gaps in the liquid display device. Thus, it is even more difficult to dispose the spacer selectively in the electrode gaps where no pixels exist.

Japanese Kokai Publication Hei-1-187533 discloses a spacer spraying apparatus wherein a spraying chamber is connected to a spacer supply tank through a pipeline and, using a gas as the vehicle, the spacer is fed from the spacer supply tank to the spraying chamber.

However, this spacer spraying apparatus is not designed for selective control of spacer falling position and incapable of preventing disposition of spacer microparticles on the display areas of the liquid crystal display device.

SUMMARY OF THE INVENTION

The present invention has for its object to overcome the above-mentioned disadvantages and provide a microparticle spraying apparatus with which the disposition of microparticles on a substrate carrying electrodes can be accurately controlled, particularly a microparticle spraying apparatus capable of selectively disposing spacer microparticles in electrode gaps where no pixels are present even on a substrate carrying an array of stripe electrodes in use for the STN liquid crystal display device, to a microparticle spraying method and a method of manufacturing a liquid crystal display device which utilize said apparatus.

The first aspect of the present invention relates to a microparticle spraying apparatus for selective disposition of a charged microparticle on a substrate carrying a plurality of electrodes which comprises a spraying chamber adapted to accommodate said substrate, a microparticle supply means for supplying said microparticle into said spraying chamber and spraying it on said substrate, and a voltage application means for applying voltages to the electrodes disposed on said substrate, said voltage application means being capable of applying different levels of voltages to said electrodes respectively.

The second aspect of the present invention relates to a microparticle spraying method comprising applying an electric potential to a plurality of electrodes on a substrate, charging a microparticle electrostatically, and spraying and disposing said microparticle selectively on said substrate, wherein a microparticle spraying apparatus includes a means for eliminating an oppositely charged microparticle.

The third aspect of the present invention relates to a microparticle spraying method comprising applying an electric potential to a plurality of electrodes formed on a substrate, charging a microparticle electrostatically, selectively spraying and disposing said microparticle on the substrate, wherein a charged element with an electric potential of the same polarity as said charged microparticles being applied is disposed in at least a domain of the surface extending from the nozzle orifice of a microparticle delivery nozzle duct to the periphery of said substrate.

The fourth aspect of the present invention relates to a microparticle spraying method comprising spraying plural kinds of microparticles constituted by dissimilar constituent material or surface composition from the corresponding microparticle tanks with a pressurized gas as the vehicle using a microparticle spraying apparatus, wherein said microparticle spraying apparatus comprises a spraying chamber for accommodating a substrate, a microparticle supply means comprising at least one microparticle delivery nozzle duct and at least one microparticle tank, both for supplying a microparticle into said spraying chamber and spraying it onto said substrate, and a voltage application means for applying voltages to a plurality of electrodes formed on said substrate, said voltage application means being capable of applying dissimilar levels of voltages to each of said electrodes.

The fifth aspect of the present invention relates to a method of manufacturing a liquid crystal display device which comprises using the above-mentioned microparticle spraying apparatus, disposing a spacer selectively on a substrate carrying a stripe electrode array constituted by a plurality of linear transparent electrodes arranged in parallel, and applying a relatively high level of voltage to an even number of linear transparent electrodes arranged in parallel and a relatively low level of voltage to an even number of linear transparent electrodes neighboring said even number of linear transparent electrodes to thereby produce a region with a relatively high potential (+(positive)) and a region with a relatively low potential (−(negative)) in an alternate pattern and, in this condition, further spraying either a positively (+) charged spacer or a negatively (−) charged spacer onto said substrate or further spraying a positive (+) charged spacer and a negatively (−) charged spacer alternately or in succession onto the substrate.

Figure 1:
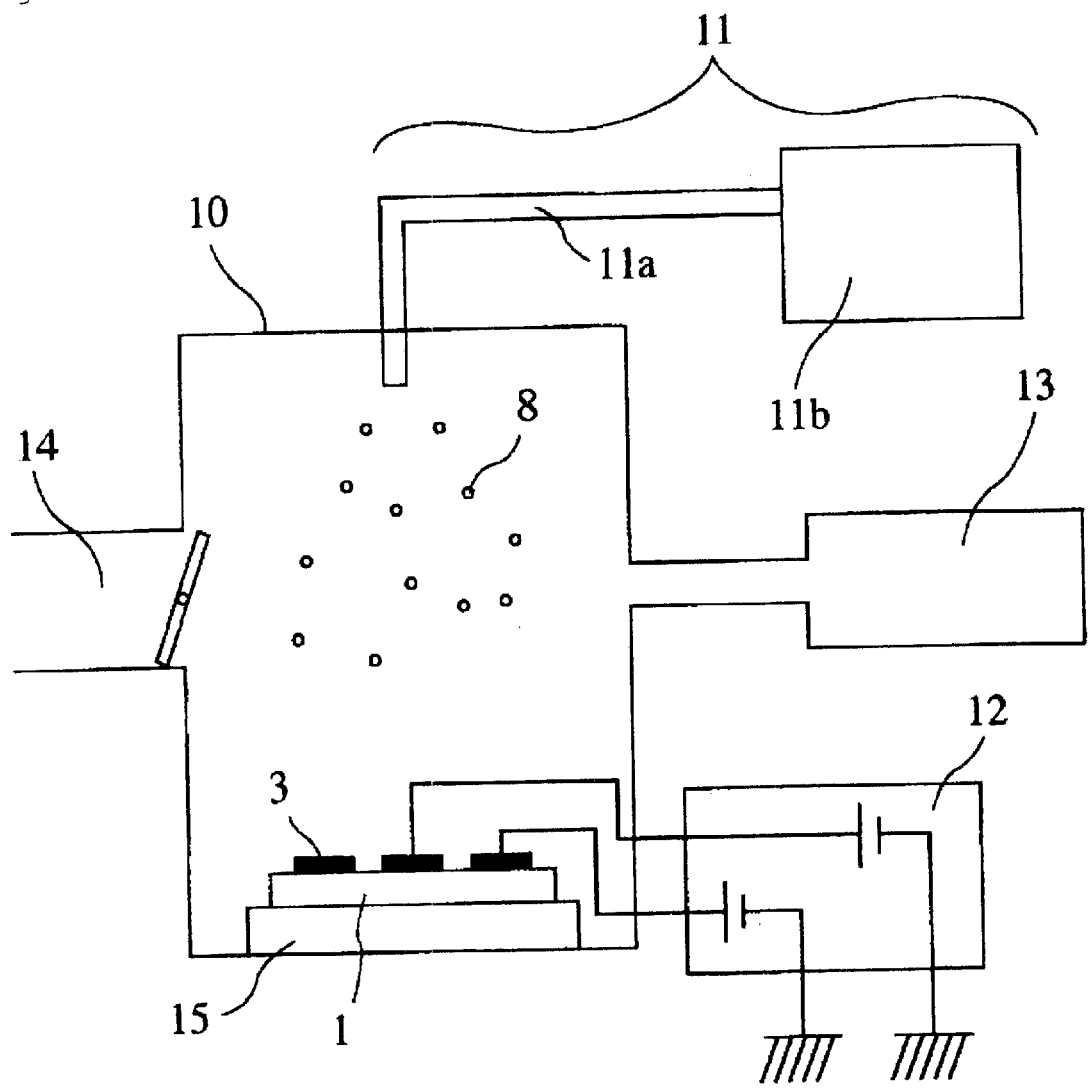
FIG. 1 is a schematic view showing a microparticle spraying apparatus embodying the principles of the invention.

EXPLANATION OF THE NUMERIC SYMBOLS 1. substrate (insulating substrate)
2. board
3, 3a, 3b. transparent electrode (display electrode)
4. color filter
5. black matrix
6. over coat
7. liquid crystal
8. microparticle (spacer)
9. alignment film
10. spraying chamber
11. microparticle supply device 11a. microparticle delivery duct
11b. microparticle tank
12. voltage application means
13. humidity controller
14. vent hole
15. conductive stage
16. variable speed fan
17. piping
18. 18a, 18b. lead wire
19. charged element
20, 20a, 20b. conductor segments

DISCLOSURE OF INVENTION

The present invention is now described in detail.

The first aspect of the present invention is directed to a microparticle spraying apparatus for selective disposition of a charged microparticle on a substrate carrying a plurality of electrodes which comprises a spraying chamber adapted to accommodate said substrate, a microparticle supply means for supplying said microparticle into said spraying chamber and spraying it on said substrate, and a voltage application means for applying voltages to the electrodes disposed on said substrate, said voltage application means being capable of applying different levels of voltages to said electrodes respectively.

Generally speaking, when two different levels of voltage are applied to two electrodes formed on a flat surface, a relatively high potential [+(positive)] region and a relatively low potential [−(negative)] region are formed and lines of electric force are formed by the potential difference. Thus, assuming that both of the voltages applied to the two electrodes are of the same polarity with respect to the earth potential (ground potential) as reference (0), insofar as a potential difference exists between the voltages applied to the two electrodes, one of the electrodes functions as an electrode of relatively +(positive) polarity to form a relatively high potential [+(positive)] region, with the other electrode functioning an electrode of relatively −(negative) polarity to form a relatively low potential [−(negative)] region. In this state, lines of electric force are formed from the electrode of relatively +(positive) polarity to the electrode of relatively negative [−(negative)] polarity. When charged microparticles are brought into the electric field in which such lines of electric force have been formed, the charged microparticles are subject to a force in the direction of the line of electric force if they are +(positively) charged or in the direction opposite to the direction of the line of electric force if they are −(negatively) charged.

The microparticle spraying apparatus according to the first aspect of the present invention achieves microparticle disposition control by applying different levels of voltages to each of said electrodes formed on a substrate to create said lines of electric force and spraying charged microparticles into the region.

The microparticle spraying apparatus according to the first aspect of the present invention comprises a spraying chamber, a microparticle supply means and a voltage application means.

The spraying chamber mentioned above is adapted to accommodate a substrate to be sprayed with microparticles and constitutes the body of the microparticle spraying apparatus of the present invention.

The spraying chamber mentioned above may comprise metal or synthetic resin. It may be a double-walled structure comprising an inner wall and an outer wall. In setting the substrate in said spraying chamber, it is preferable to provide a distance of at least 15 cm between the periphery of said substrate and the inner wall of the spraying chamber.

The spraying chamber is preferably such that the vertical flow rate of air in said spraying chamber can be freely adjusted.

As mentioned above, the microparticle spraying apparatus of this invention achieves microparticle disposition control by forming lines of electric force over a substrate and spraying charged microparticles there. The disposition characteristic depends much on the falling speed of microparticles, for the inertia force of microparticles varies with the magnitude of falling velocity, with the result that the mode in which the locus of microparticles is curved by said lines of electric force is remarkably varied.

The falling speed of microparticles is defined by the flow rate of air within the spraying chamber and the relationship of electrostatic polarity and charging amount of the microparticles to the lines of electric force formed over the substrate, among other factors. In the present invention, it is preferable to seek accurate disposition control of microparticles by adjusting the vertical flow rate of air within said spraying chamber to thereby control the falling speed of microparticles.

The falling speed of microparticles at which the precise disposition of microparticles can be achieved is not limited to one point but there are a plurality of such points; there are the case in which the falling speed of microparticles is high and the case in which the speed is low. In the present invention, the falling speed of microparticles can be controlled to such a preferred point by adjusting the vertical flow rate of air in said spraying chamber.

The method for adjusting the vertical flow rate of air in the spraying chamber is not particularly restricted but includes, among others; the method which comprises feeding compressed air or the like from the ceiling of the spraying chamber; the method in which a fan means is installed either above or below the substrate; and the method which comprises withdrawing air from a vent hole provided at the lower part of the spraying chamber. These kinds of methods can be used in a combination of two or more kinds. Particularly when compressed air is used, it is preferable to withdraw the air for creating a stream of air.

Figure 8:
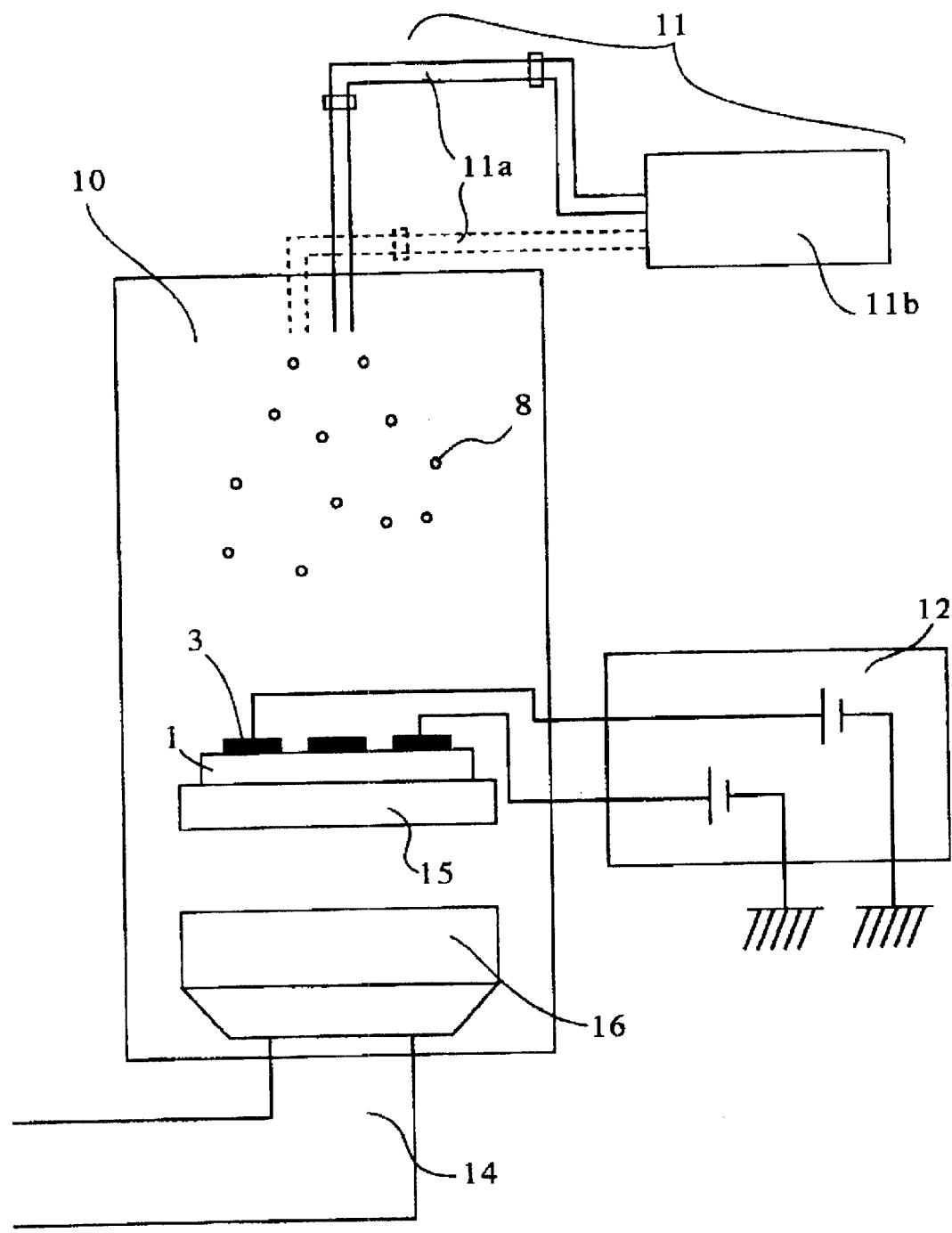
FIG. 8 is a schematic view showing another microparticle spraying apparatus embodying the principles of the invention.

FIG. 8 shows an example of said spraying chamber in which a fan is disposed below the substrate. By means of the fan, the vertical flow rate of air in the spraying chamber can be adjusted. When a fan is installed in the spraying chamber, it is preferable to provide the ceiling of the spraying chamber with apertures or use a mesh-like ceiling material so that a more uniform air stream may be created (Because of such a stream of air, the microparticles are prevented from migrating out of the spraying chamber).

Furthermore, said spraying chamber is preferably provided with a discharge port which can be opened and closed. Since the superfluous microparticles in the spraying chamber can then be withdrawn from the discharge port, the microparticle disposition accuracy can be further improved and, moreover, when the substrate carrying the microparticles disposed is withdrawn from the spraying chamber, scattering of the microparticles can be prevented.

The microparticle spraying apparatus according to the first aspect of the present invention accomplishes microparticle disposition control by bending the falling path of microparticles under the influence of lines of electric force formed over the substrate but if said discharge port is opened during the spraying of microparticles, the falling speed of microparticles is increased to thereby increase inertia force, so that the microparticles reach the substrate before their path is altered, thus detracting from disposition accuracy. Therefore, it is preferable to arrange so that the discharge port will be kept closed during the spraying of microparticles and opened after completion of spraying.

The opening and closing of said discharge port can be timer-controlled, for instance.

The discharge port mentioned above is preferably located at a level above the substrate set in the spraying chamber. If said discharge port is located at a level below the substrate in the spraying chamber, an excess of microparticles will be deposited on the substrate to detract from the accuracy of microparticle disposition.

The spraying chamber preferably has a structure which allows control of internal humidity or permits dry air purging. The electrode pattern of the substrate for liquid crystal display use is fine-detailed; for example, the electrode gap between transparent stripe electrodes on the substrate for an STN liquid crystal display device is as narrow as about 10 to 20 $\mu$m. When an electric potential is applied across electrodes with such a narrow gap, a short-circuit usually occurs. However, the risk of short-circuit is dependent on the moisture content of the atmosphere in which the substrate is located; there is a high risk of short circuit under high humidity conditions, while the risk is low in a relatively dry environment. Therefore, by using a spraying chamber which permits control of internal humidity or dry gas purging, a larger electric potential can be consistently applied between electrodes to thereby improve the accuracy of microparticle disposition as well as product yield. Moreover, since the humidity-dependent variation in the electrostatic polarity of microparticles is a cause of poor reproducibility of disposition accuracy, insuring a constant humidity environment contributes to an improved reproducibility of electrostatic polarity and accuracy of microparticle disposition.

The preferred humidity within said spraying chamber is 70% RH or less at the ambient temperature of 20 to 30° C. The dry gas which can be used for said dry gas purging may for example be air or $N^2$.

The spraying chamber is preferably provided with a stage for setting the substrate thereon. The stage is preferably a grounded stage with a volume resistivity of not more than $10^{10}\Omega$cm. When the stage is thus composed of a conductor and a high voltage repelling the linear transparent electrodes (of the kV order) is applied, a charge of opposite polarity appears on the stage due to electrostatic induction, with the result that the effect of relatively reversed polarity is developed across the electrodes owing to depolarization to favor the selective disposition of microparticles in the electrode gaps. (This does not mean that no disposition occurs at a higher volume resistivity but rather a better disposition is obtained under specified conditions.)

Moreover, when the glass substrate has been charged in a preceding step, the antistatic effect can also be obtained.

As said stage, a conductive stage comprising metal, etc. can be used with advantage but a conductive stage overlayed with an antistatic sheet may also be employed.

Furthermore, for the purpose of eliminating a fraction of microparticles charged to the opposite polarity to improve the selectivity of disposition in the electrode-free areas (electrodes gaps), the microparticle spraying apparatus according to the first aspect of the present invention is preferably provided with a charged element for eliminating such microparticles of opposite polarity within the spraying chamber.

Said charged element set in the spraying chamber is preferably provided in at least a domain of the surface extending from the nozzle orifice of a microparticle delivery nozzle duct to the periphery of the substrate.

Preferably, to said charged element, a potential of the same polarity as the microparticles is applied. Moreover, the potential to be applied is preferably larger than the potential to be applied to each of said electrodes on the substrate.

The microparticle spraying apparatus according to the first aspect of the present invention has a microparticle supply means. This microparticle supply means is adapted to feed microparticles into said spraying chamber and spraying them over the substrate.

The microparticle supply means is not particularly restricted but is preferably a device comprising a microparticle nozzle duct means and a microparticle tank and adapted to feed microparticles to said spraying chamber from said microparticle tank through said microparticle nozzle duct means with a pressurized gas as the vehicle.

With this microparticle supply means comprising said microparticle nozzle duct and microparticle tank, the microparticles can be charged +(positive) or −(negative) by letting the microparticles repeatedly contact the internal wall of said microparticle nozzle duct.

The pressurized gas to be used as said vehicle is not particularly restricted but includes compressed air and $N^2$, among others. The pressurized gas is preferably a dry gas with a minimum of moisture content.

The charging polarity of particles is defined by the work function of the material constituting the surface of microparticles and the work function of the material forming the internal wall of the microparticle delivery duct. Thus, generally when two kinds of materials differing from each other in work function are brought into contact, the electrons begin to shift from the material with a smaller work function to the material with a larger work function so that a potential difference known as contact potential difference is produced between the two materials. As a result, the material with a smaller work function is positively charged while the material with a larger work function is negatively charged. Thus, when the work function of the material constituting the surface of microparticles is smaller than the work function of the material constituting the internal wall of the microparticle delivery duct, the microparticles are positively (+) charged. Conversely, when the former is larger than the latter, the microparticles are negatively (−) charged. In this connection, there is the tendency that the larger the difference in work function is, the more strongly charged are the microparticles, while the microparticles are weakly charged when said difference is smaller. Incidentally, the work function of a material can be calculated according to the contact potential difference from a material with a known work function.

In the first aspect of the present invention, the microparticle supply means comprising said microparticle delivery duct and microparticle tank may be a device having only one microparticle delivery duct or a device having two or more microparticle delivery ducts but is preferably a device having two or more microparticle delivery ducts varying in constituent material. With a microparticle supply means of such construction, the microparticles can be selectively charged +(positive) or −(negative) by routing the microparticles through the proper one of said plural delivery nozzle ducts comprising dissimilar materials.

The constituent materials of said two or more microparticle delivery nozzle ducts can be judiciously selected according to the relationship to the material of the microparticles used.

The above microparticle supply means having said two or more microparticle delivery ducts comprising dissimilar materials may have only one microparticle tank but may optionally have two or more microparticle tanks.

When, as said microparticle supply means having two or more microparticle delivery ducts comprising dissimilar materials, a device having two delivery ducts, for instance, is used, microparticles of one and the same composition can be selectively charged +(positive) or −(negative) by routing them through one or the other of the two microparticle delivery ducts of different materials. Therefore, by switching the microparticle delivery nozzle ducts from one to the other during spraying of microparticles, the +(positive)-charged microparticles and −(negative)-charged microparticles can be alternately or sequentially sprayed on the substrate.

Furthermore, in this first aspect of the present invention, a microparticle supply means having two or more microparticle tanks can also be used with advantage as said microparticle supply means comprising said microparticle delivery duct and microparticle tank. When it is so arranged that the two or more microparticle tanks contain microparticles comprising dissimilar kinds of materials or having dissimilar surface compositions, the microparticles from said microparticle tanks can be charged +(positive) or −(negative) by routing them through the delivery duct.

When, as said microparticle supply means having two or more microparticle tanks, one having two microparticle tanks is used, for instance, one of two kinds of microparticles varying in constituent material or surface composition may be charged +(positive) by routing them through the microparticle delivery duct while the other of said two kinds of microparticles varying in constituent material or surface composition can be charged −(negative) by routing them through the same microparticle delivery duct. Therefore, by performing the spraying operation with two kinds of microparticles varying in constituent material or surface composition alternately or in sequence, the +(positive)-charged microparticles and −(negative)-charged microparticles can be alternately or sequentially disposed on the substrate.

As the microparticle delivery duct of the above microparticle supply means, it is preferable to use two or more nozzle ducts dissimilar in constituent material as connected in series. As mentioned above, the first aspect of the present invention accomplishes the disposition control of microparticles through the interaction of charged particles with the electric field formed by the potential difference between electrodes on the substrate. However, unless the relationship of said charging amount of microparticles to said potential difference is adequate, the microparticles may not be disposed selectively in the electrode gaps but deposited on the electrodes as well. Thus, when either said charging amount or said potential difference is too large, the falling microparticles are too greatly attracted to the electrodes or the stream of microparticles is biased too much, resulting in deposition thereof on the electrodes. When the charging amount or potential difference is too small, too, the microparticles may fall on the electrodes because the locus of falling microparticles is not sufficiently altered.

While the potential difference between electrodes can be adjusted by varying the voltage values to be applied to said electrodes respectively, it has heretofore been impossible to control the charging amount of microparticles, although microparticles can, of course, be charged. The above microparticle supply means according to the first aspect of the present invention has the above microparticle delivery duct means and, therefore, is capable of controlling the charging amount of microparticles which has not been achieved by the prior art.

Since the charging amount of microparticles is defined by the relationship of microparticles to the duct material as mentioned above, the charging amount of microparticles can be controlled to a suitable level by, for example, connecting a duct composed of a material capable of charging microparticles in a great degree in series with a duct composed of a material capable of charging microparticles only in a minor degree. As an alternative, the charging amount, inclusive of the charging polarity, of microparticles can be judiciously controlled by connecting a duct composed of a material capable of charging microparticles +(positive) in series with a duct composed of a material capable of charging microparticles −(negative).

The constituent material of said duct means may be a metal or a resin and can be judiciously selected in consideration of charging polarity and charging amount.

The metallic duct is not particularly restricted but may be a duct composed of a simple metal such as Ni, Cu, Al or Ti or a duct comprising an alloy such as SUS. Moreover, it may be a duct internally covered with a metallic film comprising Au, Cr, etc. as formed by plating, for instance. Moreover, the internal wall of a metallic duct may be covered with a thin film composed of a different metal or a synthetic resin.

When a resin pipe is used as said delivery duct means, the outer wall of the pipe is preferably covered with a conductive metal. The microparticles are electrostatically charged as they contact with the internal wall of the duct but the electric charge comes in and goes out between the resin duct and the microparticles. The apparatus itself is grounded and, therefore, when the outer wall of the resin duct is covered with a metal, the electric charge comes in and goes out between the resin duct and the ground so that the charge on the microparticles can be stabilized.

The microparticle delivery duct is preferably such that the ratio of the lengths of its component ducts connected in series can be freely altered. By changing the relative lengths of component ducts comprising dissimilar materials, the charging amount of microparticles can be fine-controlled. Assuming, for example, that A is a component duct adapted to charge microparticles in a high degree and B is a component duct adapted to charge microparticles in a low degree, the charging amount of microparticles can be fine-controlled by means of the microparticle delivery duct constituted by connecting component ducts A and/or B in series in the combination of AAA, ABA, or ABB, for instance.

Furthermore, the microparticle delivery duct is preferably such that its total length is freely adjustable. By varying the total length, the charging amount of microparticles can be further fine-controlled.

The thus-controlled charging amount of microparticles can be assessed by means of E-SPART Analyzer (Hosokawa Micron Co.), for instance.

When, as said microparticle supply means, one having two or more microparticle delivery ducts comprising dissimilar materials is used, the combination of said two or more delivery ducts may comprise a metal component duct and a resin component duct covered with a metal, or two or more ducts comprising dissimilar materials.

The microparticle spraying apparatus according to the first aspect of the present invention is equipped with a voltage application means. This voltage application means is designed to apply voltage to a plurality of electrodes formed on a substrate and is capable of applying different levels of voltages to said electrodes respectively.

The voltage to be applied by said voltage application means is preferably DC voltage or pulse voltage.

Figure 2:
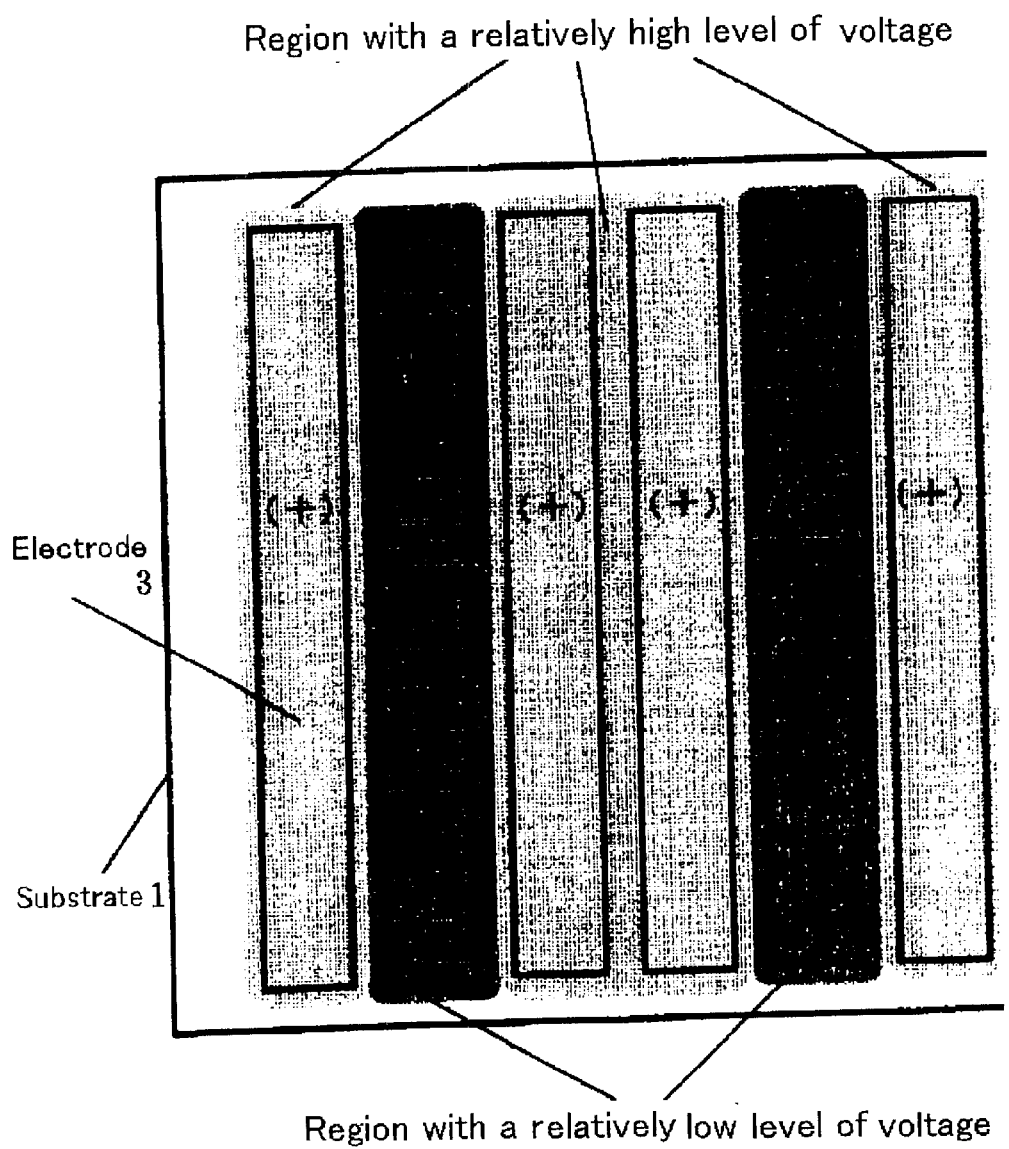
FIG. 2 is a schematic view showing a relatively high potential (+(positive)) region and a relatively low potential (−(negative)) region as formed on a stripe electrode array as viewed from above said array.
Figure 3:
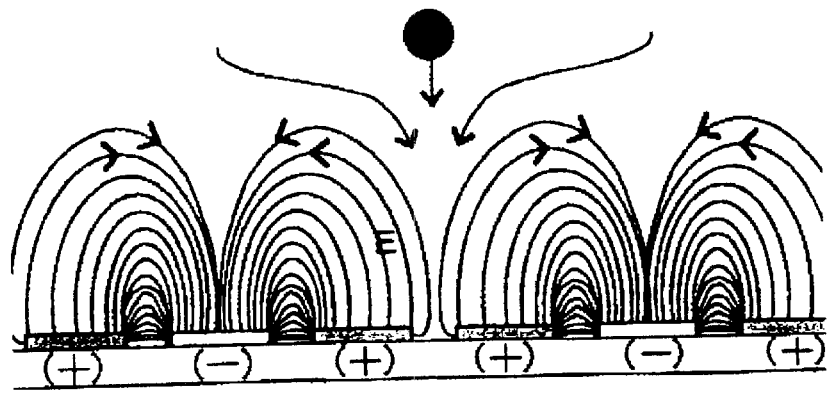
FIG. 3 is a schematic view showing the lines of electric force formed in the region of potential difference shown in FIG. 2, as viewed from the lateral side of said stripe electrode array.

The application of different levels of voltages to said electrodes respectively by said voltage application means can be carried out typically as follows. Thus, in the case where said plurality of electrodes formed on a substrate are stripes for instance, the pattern of applying a relatively high level of voltage to two adjacent electrodes and a relatively low level of voltage to one neighboring electrode is repeated as illustrated in FIG. 2. By applying the voltage in the above pattern, a region with a relatively high potential (+(positive)) and a region with a relatively low potential (−(negative)) are alternately formed on the substrate, with the result that lines of electric force are produced as illustrated in FIG. 3. Therefore, when the microparticles fed and ejected from said microparticle supply means have been negatively charged (−), the microparticles are subjected to forces acting in the direction opposite to said lines of electric force so that they are disposed in the gap between each two electrodes to which a relatively high voltage has been applied.

The voltage of dissimilar levels as applied for selective disposition of microparticles may be voltage of mutually different polarities or voltage of the same polarity. Furthermore, when the polarity of charged microparticles is −(negative), both of said voltages of dissimilar levels may be either +(positive) or −(negative). In any event, it is necessary and sufficient that said voltage levels may form a gradient such that a relatively high potential (+(positive)) region and a relatively low potential (−(negative)) region will be alternately formed. Thus, even when the microparticles are negatively (−) charged or when both the polarity of a relatively high voltage and that of a relatively low voltage are (negative), the microparticles are not strongly repelled because of the lines of electric force although the number of microparticles reaching the substrate will be somewhat decreased, so that the microparticles can be disposed in the intended positions. When the microparticles have been positively (+) charged, too, provided that the voltage form a gradient, the polarity of voltage is immaterial.

When microparticles have been positively (+) charged, the pattern-wise application of dissimilar voltage may comprise applying a relatively low voltage to each two adjacent electrodes and a relatively high voltage to one neighboring electrode, whereby the microparticles can be disposed in the electrode gaps as in the foregoing arrangement.

Figure 4:
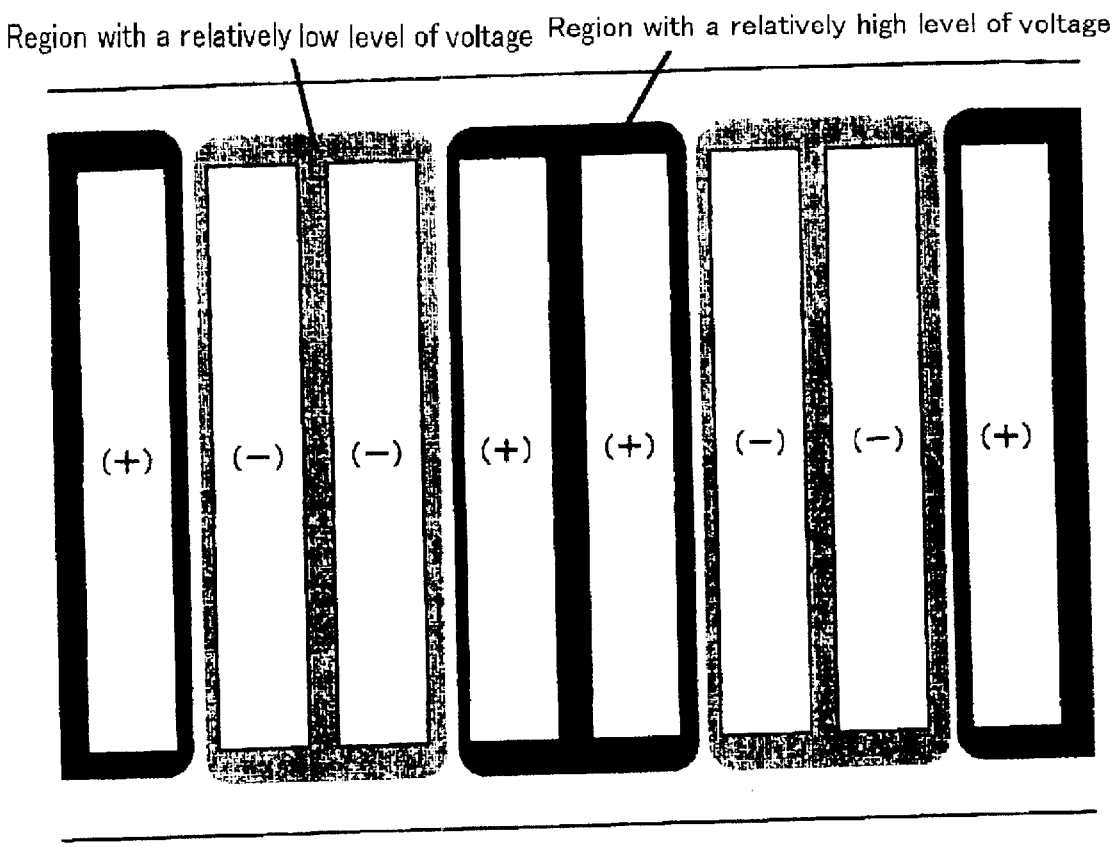
FIG. 4 is a schematic view showing a relatively high potential (+(positive)) region and a relatively low potential (−(negative)) region as formed on a stripe electrode array, as viewed from above said array.
Figure 5:
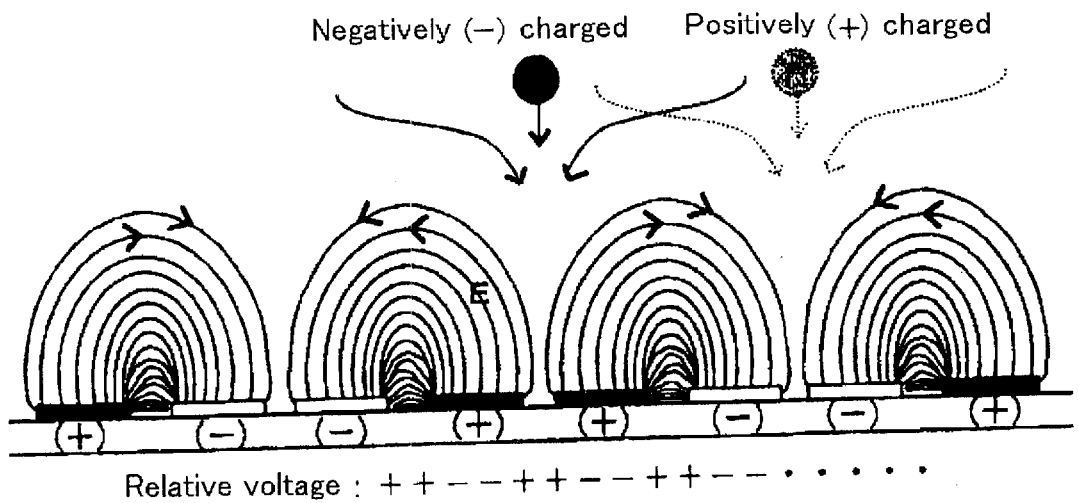
FIG. 5 is a schematic view showing the lines of electric force formed in the region of potential difference shown in FIG. 4, as viewed from the lateral side of said stripe electrode array.

Moreover, the pattern-wise application of dissimilar voltage to said electrodes respectively by said voltage application means may for example comprise applying a relatively high voltage and a relatively low voltage to two electrodes each in an alternate fashion and repeating this application pattern as illustrated in FIG. 4. By applying voltages in accordance with the above application pattern, a relatively high potential (+(positive)) region and a relatively low potential (−(negative)) region are formed alternately on the substrate so that the lines of electric force illustrated in FIG. 5 are produced. Therefore, when the microparticles supplied and sprayed from said microparticle supply means have been negatively (−) charged, the microparticles are subject to forces acting in the direction opposite to the lines of electric force, with the result that the microparticles are disposed in the gap between the two electrodes to which a relatively high voltage has been applied. When the microparticles have been positively (+) charged, the microparticles are subject to forces corresponding to the lines of electric force so that they are disposed in the gap between two electrodes to which a relatively low voltage has been applied.

When such a voltage application pattern is adopted, both of positively (+) charged microparticles and negatively (−) charged microparticles can be sprayed and disposed in independent and different positions. In this case, if the positively (+) charged microparticles and negatively (−) charged microparticles are delivered concurrently, the (+) and (−) charged microparticles may form aggregates. Therefore, the differently charged microparticles are preferably delivered alternately or one after another.

Furthermore, when such an application pattern is used, the position of microparticle disposition may be switched by changing the polarity and level of voltage in the course of spraying of the microparticles. Thus, the voltage application means is preferably one capable of changing the polarity and level of voltage to be applied to each electrode on a substrate in the course of spraying.

The application of voltage at different levels to a plurality of electrodes by said voltage application means may also comprise applying a relatively high voltage to an even number of electrodes arranged side by side and a relatively low voltage to an even number of similarly arranged electrodes adjacent to the first-mentioned even number of electrodes and repeating this application pattern. More particularly, expressing the relatively high voltage as + and the relatively low voltage as −, the above voltage application pattern may for example be . . . −−++++−−++++−−. . . . As the voltage is applied in such a pattern, a relatively high potential (+(positive)) region and a relatively low potential (−(negative)) region are alternately formed on the substrate to produce lines of electric force. The relatively +(positive) valley of the lines of electric force and the relatively −(negative) valley of the lines of electric force are respectively formed in the central position of the relatively high potential (+(positive)) region and the central position of the relatively low potential (−(negative)) region, that is to say in agreement with the positions of electrode gaps. Therefore, just as in the voltage pattern obtained by applying a relatively high voltage and a relatively low voltage to two electrodes each, positively (+) charged microparticles and negatively (−) charged microparticles can be disposed in different positions by delivering those microparticles alternately or in sequence.

Figure 6:
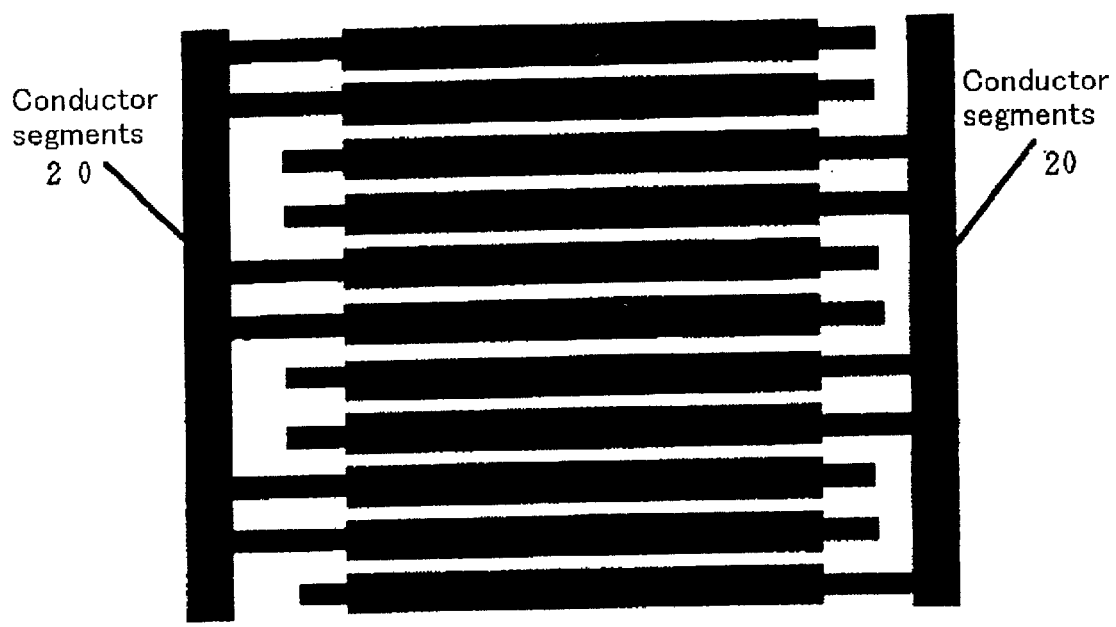
FIG. 6 is a schematic view showing the comb-shaped electrodes used in a microparticle spraying apparatus embodying the principles of the invention.

The application of voltages to stripe electrodes according to the above-mentioned pattern by means of said voltage application means may for example be accomplished as illustrated in FIG. 6, that is to say by constituting a stripe electrode array by disposing two comb-shaped electrode members each having a given pattern in staggered relation and attaching the connecting terminals for two electrodes each to conductor segments 20 of the two comb-shaped electrode members. As an alternative, the voltage application may be achieved by forming connecting terminals each in a width corresponding to 2 electrodes forming the stripe electrode array and attaching the connecting terminals to each two electrodes alternately at both ends of the stripe electrode array. It is also possible to form each of said connecting terminals in a width corresponding to one electrode and attaching the needle-shaped connecting terminal to the corresponding electrode. The voltage application may also be carried out by applying a voltage directly by means of a prover.

In applying voltages to each of said electrodes on the substrate by said voltage application means, for example by applying a voltage of 1000 V to one of the two terminals connected to the electrodes and a voltage of 1100 V to the other terminal to provide a potential difference of 100 V, it is preferable to apply a voltage of 1000 V to both terminals and, then, increase the voltage of the other terminal to 1100 V. This is because, when a voltage of 1000 V is applied only to one of the two terminals in advance with both terminals having been connected to the electrodes, the potential difference between the two terminals will become 1000 V and be liable to cause a short circuit. As an alternative, it is possible to connect the terminal, to which a voltage of 1000 V has been applied to the electrode and, then, connect the terminal to which a voltage of 1100 V has been applied, to the electrode.

The voltage application conditions for use in applying voltages to said electrodes respectively on the substrate by said voltage application means can be judiciously selected according to the magnitude of electrode gap and the charging amount of microparticles, among other factors. For example, even when the polarity of charge on microparticles is (negative), it is sometimes more conducive to an improved disposition of microparticles to provide a potential difference of 100 V by applying a potential difference between −1100 V and −1000 V, thus 100 V, than applying a potential difference between 0 to 100 V, thus 100 V. The rationale is as follows. In the case of a potential difference formed by a polarity opposite to the polarity of charge on microparticles, the microparticles are first subjected to the influence of a gravitational force in a position far away from the substrate to have their falling speed accelerated but in the case of a potential difference formed by the same polarity as the polarity of charge on microparticles, the falling speed of the microparticles tends to be decelerated by the influence of a repulsive force and altered in their inertia force so that the degree of compliance of microparticles with the lines of electric force is changed, thus resulting in a change in the position of microparticles disposed on the substrate. Depending on cases, it is preferable to form a large potential difference by using a polarity opposite to the polarity of charge on microparticles to cause the stream of microparticles to comply as much as practicable with the lines of electric force.

In spraying microparticles with the microparticle spraying apparatus according to the first aspect of the present invention, the microparticles may be sprayed on an intermittent basis, for example by carrying out 10 seconds of spraying and 1 second of cessation in 10 cycles. By such an intermittent spraying of microparticles, the mis-disposition of microparticles due to a turbulence of pressurized gas can be prevented.

The microparticles which can be disposed by means of the spraying apparatus according to the first aspect of the present invention is not particularly restricted but may be metallic microparticles, synthetic resin microparticles, inorganic microparticles, and light-opaque microparticles comprising a dispersion of pigment particles in a synthetic resin matrix, colored microparticles, microparticles responsive to heat or light to develop adhesion, and metal, synthetic resin or inorganic microparticles whose surfaces have been plated with a metal, among others. The method of spraying said microparticles may be whichever of dry and wet spraying methods. In the wet spraying system, the spacer is dispersed in a mixed solvent such as water-alcohol but since the spacer can be charged even under such conditions, the effects of the invention are not comprised. However, since microparticles with a larger charging amount can be more accurately disposed, the dry spraying system is preferred.

As the substrate on which microparticles can be deposited by means of the microparticle spraying apparatus according to the first aspect of the present invention, there can be mentioned, for example, glass substrates, resin substrates and metal substrates each carrying a plurality of electrodes on the surface. However, when a metal substrate is used, an insulation layer should be formed on the substrate to prevent short-circuiting of the surface electrodes.

The electrodes on a substrate in the context of the first invention are not particularly restricted but may for example be transparent electrodes, such as linear transparent electrodes. A stripe electrode pattern constituted by such linear transparent electrodes arranged in parallel on a substrate can be adopted.

The stripe electrode pattern mentioned above is the pattern used for the display electrodes of a liquid crystal display device.

The second invention is directed to a microparticle spraying method comprising applying an electric potential to a plurality of electrodes on a substrate, charging a microparticle electrostatically, and spraying and disposing said microparticle selectively on said substrate, wherein a microparticle spraying apparatus includes a means for eliminating an oppositely charged microparticle.

In accordance with this invention, therefore, said fraction of microparticles charged to an opposite polarity can be eliminated to improve the selectivity of disposing microparticles in the electrode-free areas (electrode gaps)

The third aspect of the present invention is concerned with a microparticle spraying method comprising applying an electric potential to a plurality of electrodes on a substrate, charging a microparticle electrostatically, selectively spraying and disposing said microparticle on said substrate, wherein a charged element with an electric potential of the same polarity as said microparticle being applied is disposed in at least a domain of the surface extending from the nozzle orifice of a microparticle delivery duct to the periphery of said substrate.

Thus, the stream of oppositely charged microparticles ejected from the nozzle orifice is subjected to a force attracting them toward said charged element and thereby diverted so that the microparticles are sprayed away from the substrate or outside of said plurality of electrodes.

Only provided that it is on said surface extending from the nozzle orifice of said microparticle delivery duct to the periphery of said substrate, comparative effect can be obtained.

However, when such a charged element is disposed on the wall of the spraying chamber as in the prior art, no comparable effect can be obtained because of the large distance between the charged element and the microparticles.

The potential applied to said charged element is preferably higher than the potential to be applied to the electrodes on the substrate.

Thus, microparticles charged to a given polarity are disposed in selected positions on the substrate. If the potential applied to said charged element is low, the stream of microparticles is diverted by the repulsive force from the electrodes on the substrate so that the microparticles are rather deposited on the charged element.

The fourth aspect of the present invention relates to a microparticle spraying method comprising spraying plural kinds of microparticles constituted by dissimilar constituent material or surface composition from the corresponding microparticle tanks with a pressurized gas as the vehicle using a microparticle spraying apparatus, wherein said microparticle spraying apparatus comprises a spraying chamber for accommodating a substrate, a microparticle supply means comprising at least one microparticle delivery nozzle duct and at least one microparticle tank, both for supplying a microparticle into said spraying chamber and spraying it onto said substrate, and a voltage application means for applying voltages to a plurality of electrodes formed on said substrate, said voltage application means being capable of applying dissimilar levels of voltages to each of said electrodes.

By this method, microparticles contained in said microparticle tanks, respectively, can be charged positively (+) or negatively (−) and sprayed from said microparticle spraying apparatus.

Preferably, said microparticles are sprayed as positively (+) charged by passage through one of said microparticle delivery ducts and as negatively (−) charged by passage through another microparticle delivery duct.

It is also preferable that one of two kinds of microparticles varying in constituent material or surface composition be positively (+) charged by routing them through a microparticle delivery duct while the other kind of microparticles be negatively (−) charged by passage through the microparticle delivery duct.

Thus, by spraying two kinds of microparticles varying in constituent material or surface composition alternately or serially, the microparticles charged positively (+) and the microparticles charged negatively (−) can be independently disposed on a substrate.

From the standpoint of preventing inaccurate disposition of microparticles due to a turbulence of pressurized gas within said spraying chamber, the spraying of microparticles is preferably carried out on an intermittent basis.

The fifth aspect of the present invention is directed to a method of manufacturing a liquid crystal display device, which comprises using the microparticle spraying apparatus according to the first aspect of the present invention, disposing a spacer selectively on a substrate carrying a stripe transparent electrode pattern constituted by plural linear transparent electrodes arranged in parallel, and applying a relatively high level of voltage to an even number of linear transparent electrodes arranged in parallel and a relatively low level of voltage to an even number of similarly arranged linear transparent electrodes neighboring the first-mentioned even number of linear transparent electrodes to thereby produce a relatively high potential (+(positive)) region and a relatively low potential (−(negative)) region in an alternate pattern and, in this condition, spraying either a positively (+) charged spacer or a negatively (−) charged spacer onto said substrate, or a positively (+) charged spacer and a negatively (−) charged spacer alternately or in succession onto the substrate.

The method of manufacturing a liquid crystal display device according to the fifth aspect of the present invention comprises using the microparticle spraying apparatus according to the first aspect of the invention. Thus, by means of the microparticle spraying apparatus of the first aspect of the invention, the microparticley spacer is disposed selectively on a substrate carrying a stripe transparent electrode array constituted by a plurality of linear transparent electrodes arranged in parallel.

In this fifth aspect of the invention, a relatively high level of voltage is applied to each even number of linear transparent electrodes arranged in parallel and a relatively low level of voltage to each even number of linear transparent electrodes neighboring the first-mentioned even number of linear transparent electrodes as similarly arranged in parallel. By applying voltages according to the above application pattern, a relatively high potential (+(positive)) region and a relatively low potential (−(negative)) region are formed alternately on the stripe transparent electrode pattern.

In the potential regions thus formed, the relatively +(positive) valley and the relatively −(negative) valley of lines of electric force invariably coincide with the gaps between linear transparent electrodes.

Therefore, by spraying a positively (+) charged spacer or a negatively (−) charged spacer selectively by means of the microparticle spraying apparatus according to the first aspect of the invention, the spacer microparticles can be exactly disposed in the gaps between linear transparent electrodes.

In the method of manufacturing a liquid crystal display device according to the fifth aspect of the present invention, spacer spraying may be carried out on an intermittent basis, for example in 10 cycles each comprising 10 seconds of spraying followed by 1 second of cessation. By such an intermittent spraying of spacer microparticles, the disturbance of spacer disposition due to a turbulence of pressured gas can be prevented.

The spraying apparatus according to the first aspect of the present invention is capable of disposing microparticles accurately on a substrate. Therefore, in the liquid crystal display device, particularly STN liquid crystal display device, which has been manufactured by the liquid crystal display manufacturing method according to this fifth aspect of the invention, the spacer is exactly disposed under the black matrix pattern so that the device features a high contrast without light leaks attributable to the spacer.

An embodiment of the microparticle spraying apparatus of the present invention is now described, reference being had to the accompanying drawings.

FIG. 1 is a schematic view showing a microparticle spraying apparatus embodying the principles of the present invention. A spraying chamber 10 is provided with a microparticle supply device 11 comprising a microparticle delivery duct 11a and a microparticle tank 11b, a voltage application means 12, and a humidity controller 13.

The spraying chamber 10 is further equipped with a vent hole 14 and a conductive stage 15. The vent hole 14 is disposed at a level above a substrate 1 and can be switched ON and OFF by timer-control. The substrate 1 is set on said stage 15.

The voltage application means 12 can be set to any output voltage value and polarity and is connected to a plurality of transparent electrodes 3 formed on the substrate 1 through connecting terminals.

The humidity control means 13 maintains the relative humidity within the spraying chamber 10 at a constant level.

The microparticles (spacer) 8 fed from the microparticle tank 11b through the microparticle delivery duct 11a to the spraying chamber 10 by means of compressed air are charged as they repeatedly contact (collide with) the inner wall of said microparticle delivery duct 11a. To the electrodes 3 formed on the substrate 1, different levels of voltage are applied by the voltage application means 12, so that lines of electric force are formed in certain patterns on the substrate 1. Therefore, the charged microparticles (spacer) 8 are subjected to the influence of these lines of electric force, whereby the disposition thereof on the substrate 1 is controlled.

Figure 7:
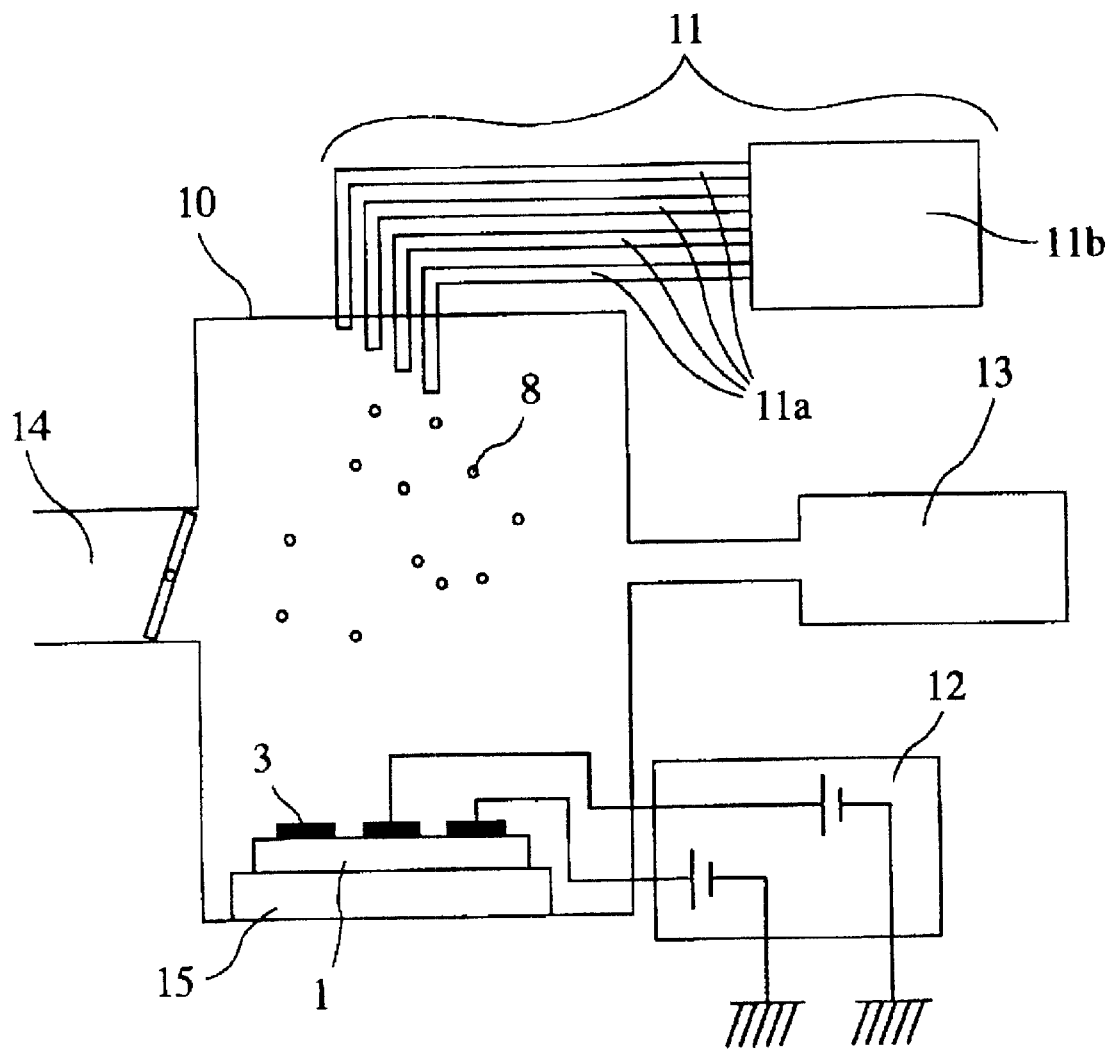
FIG. 7 is a schematic view showing a microparticle spraying apparatus embodying the principles of the invention.

FIG. 7 is a schematic view showing another microparticle spraying apparatus embodying the principles of the present invention. In this embodiment, the microparticle supply means 11 has at least two microparticle delivery ducts 11a. Otherwise, the construction of the apparatus is identical to the construction according to the embodiment described hereinbefore.

Figure 9:
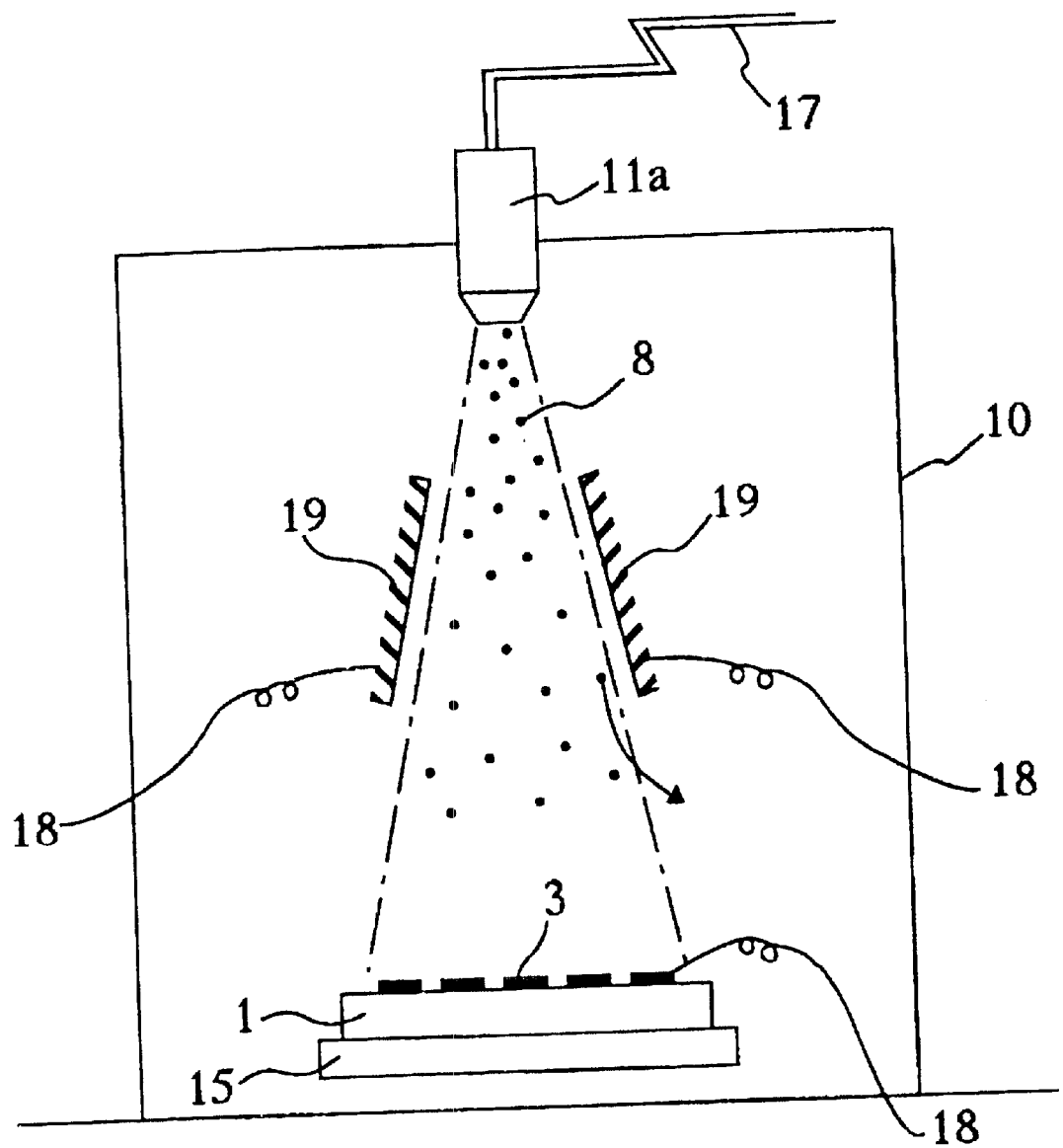
FIG. 9 is a schematic view showing still another microparticle spraying apparatus embodying the principles of the invention.

FIG. 9 is a schematic view showing still another spraying apparatus embodying the principles of the invention. In the microparticle spraying apparatus according to this embodiment, a hermetically or substantially hermetically sealed, clean spraying chamber 10 is provided, at its top, with a microparticle delivery duct 11a used for ejecting charged spacer microparticles 8. This microparticle delivery duct 11a is connected to a supply device for feeding the spacer 8 and nitrogen gas (not shown) through piping 17. In the lower region of the spraying chamber 10, an insulating substrate 1 comprising glass or the like and carrying display electrodes 3 is disposed, with a lead wire 18 for applying potentials to the display electrodes 3 to form an electric field being further provided. The wall surface of the microparticle spraying chamber comprises polyvinyl chloride so that, when spraying the charged spacer 8, the wall surface is charged to the same polarity as the spacer 8, with the result that the charged spacer will not be attracted onto the wall. Moreover, a charged element 19 to which a potential of the same polarity as the spacer 8 is disposed within the microparticle spraying chamber.

The method of charging the spacer 8 includes the method of charging microparticles with the microparticle supply means described above, the method of applying a potential to the spacer 8 with a static charger (not shown) installed within the microparticle spraying chamber, and the method of charging the spacer by friction using a microparticle delivery means comprising a stainless steel or other metal duct, among others, and any of those methods can be selectively used.

Figure 10:
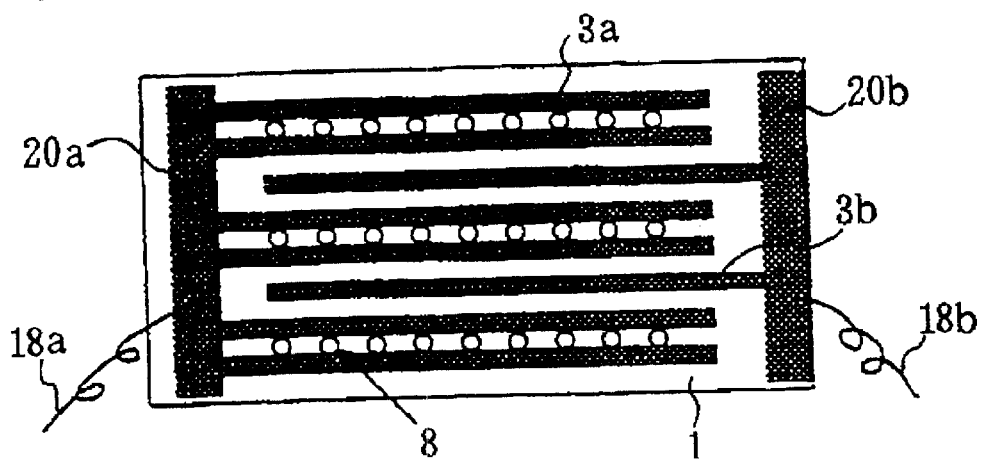
FIG. 10 is a sectional view showing the electrode pattern according to one embodiment of the invention.

As shown in FIG. 10, the electrode pattern of said plurality of electrodes comprises, as formed on the insulating substrate 1, stripe display electrodes 3a, 3b, and conductors 20a, 20b for applying potentials to the display electrodes 3a, 3b. Connected to conductors 20a, 20b are lead wires 18a, 18b for supplying a current to conductors 20a, 20b for forming an electric field. As an alternative, an electric potential may be directly applied to each of display electrodes 3a, 3b by means of probe pins or the like, i.e. without provision of conductors 20a, 20b.

The display electrodes 3a are paired. The display electrode 3b is a display electrode interposed between a pair of display electrodes 3a and another pair of display electrodes 3a. As explained below, the spacer 8 is selectively disposed exclusively between the display electrodes 3a forming a pair.

Figure 11:
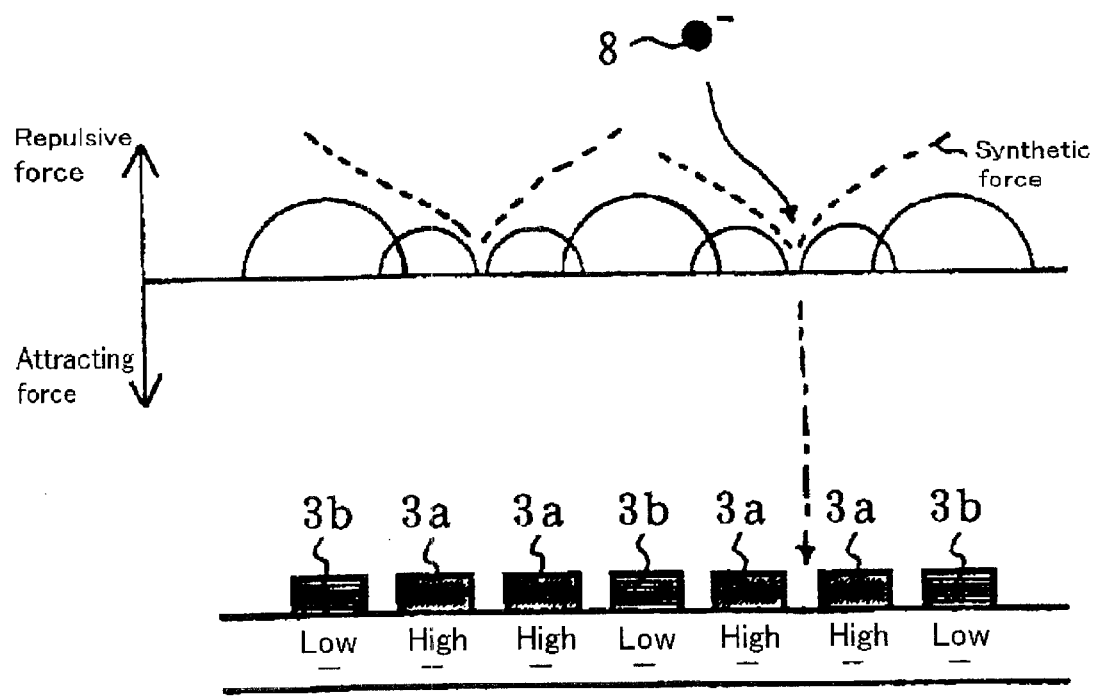
FIG. 11 is a schematic view illustrating the mode of disposition of the spacer according to electric fields in the embodiment of the invention.
Figure 12:
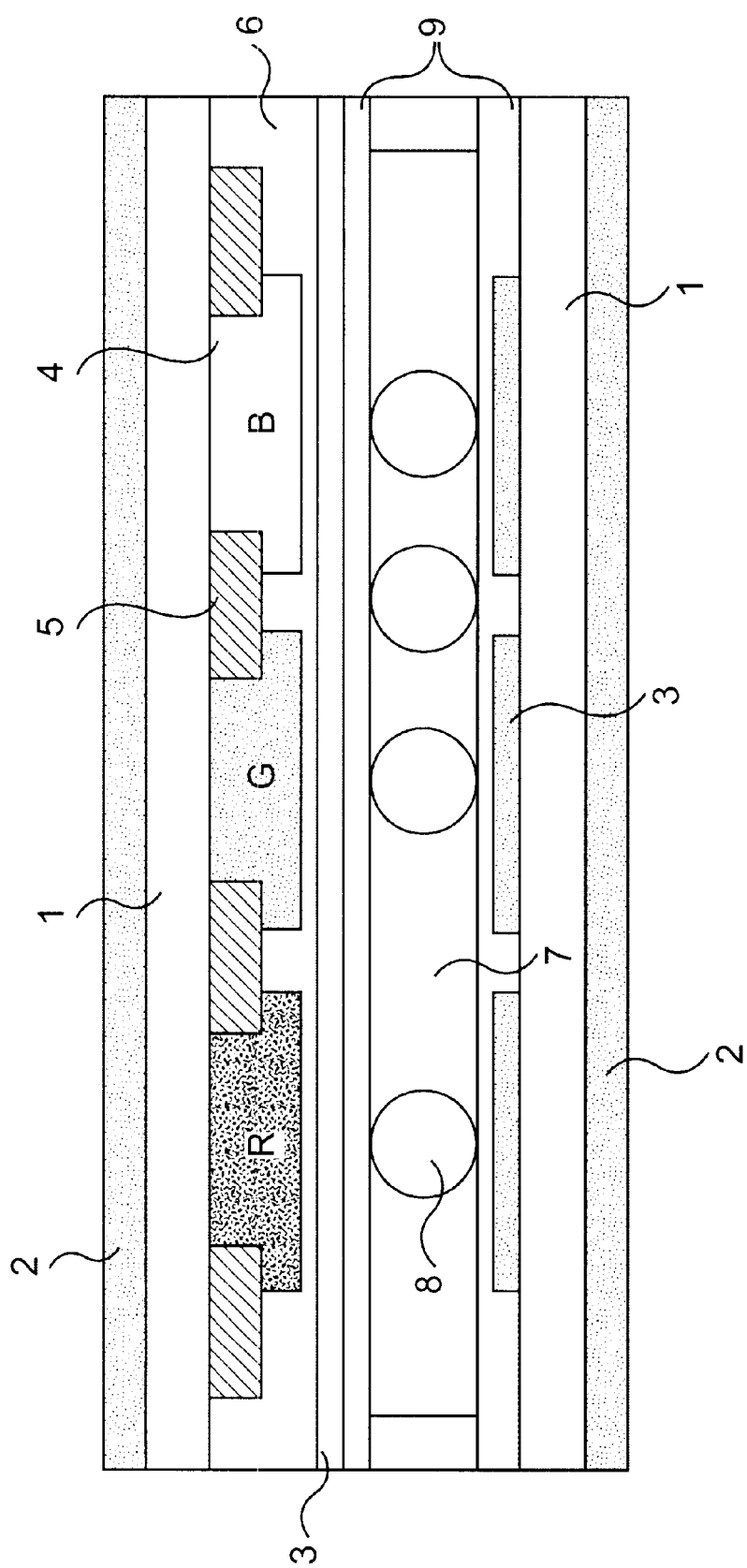
FIG. 12 is a schematic section view of the conventional liquid crystal display device.

As shown in FIG. 11, dissimilar levels of voltage are applied to the plurality of linear transparent electrodes arranged in parallel. Thus, negative voltage (−) are applied to the linear transparent electrodes 3a, 3b but a relatively high potential is applied to the linear transparent electrodes 3a than to the linear transparent electrodes 3b. Furthermore, the spacer 8 is charged negatively and, then, sprayed. In this arrangements the spacer can be disposed exclusively between the display electrodes 3a forming a pair.

Although a simple matrix liquid crystal display cell is used in this embodiment, the invention is not restricted to the simple matrix liquid crystal display cell but can of course be applied to a ferroelectric liquid crystal display cell or a TFT liquid crystal display cell.

BEST MODE FOR CARRYING OUT THE INVENTION

The following examples illustrate the present invention in further detail and should by no means be construed as defining the scope of the invention.

EXAMPLE 1

In the common electrode design for STN liquid crystal display devices (color filter-formed substrate, RGB pixel aperture size 80×285 $\mu$m, black matrix line width 20 $\mu$m, ITO electrode width 290 $\mu$m, electrode gap 15 $\mu$m, sheet thickness 0.7 mm), a substrate with the stripe electrodes (ITO electrodes) wired through conductive segments out of the display unit to form a 2:2 comb electrode assembly was fabricated (FIG. 6).

On the substrate thus prepared, a 0.05 $\mu$m-thick polyimide alignment film was constructed and subjected to rubbing treatment.

Then, as illustrated in FIG. 1, said substrate was set in the spraying chamber of a spraying apparatus, and terminals for voltage application were connected to said conductive segments so that a direct current voltage could be applied independently to each of the conductive segments.

The microparticle tank was filled with the synthetic resin microparticle Micropearl BB (particle diameter 5.1 $\mu$m, Sekisui Fine Chemical Co.). The Micropearl BB had been negatively (−) charged.

A DC voltage of +150 V was applied to one of said voltage application terminals, while a DC voltage of −150 V was applied to the other terminal. In this condition, under timer control, the spacer was ejected with the aid of compressed air over the substrate for 20 seconds and, after a settling time of 60 seconds, the vent hole was opened for 30 seconds. At the end of this vent time, the voltage application was turned OFF.

The internal temperature was set to 25° C. and the humidity within the spraying chamber was controlled at 40% RH.

Microscopic examination of the substrate sprayed with the spacer as above revealed that the spacer had been disposed exclusively between the electrodes to which a voltage of +150 V was applied, that is to say under the black matrix (disposed at intervals of every 4 stripe electrodes). The spacer microparticles on the substrate were counted and the number per 1 $mm^2$ was calculated. The number was 200/$mm^2$.

By cutting the conductive part of the substrate used, a common electrode panel similar to the conventional one was obtained.

EXAMPLE 2

Except that the spraying time was set to 20 seconds and the voltage was applied under the same conditions as in Example 1 for an initial 10 seconds and thereafter in the reversed polarity for the remaining 10 seconds, the spacer was sprayed in otherwise the same manner as in Example 1.

Microscopic examination of the substrate sprayed with the spacer as above revealed that, in addition to the same disposition lines as in Example 1, the spacer had been disposed between the other comb-shaped electrodes (at intervals of every two stripe electrodes). The number of spacer microparticles on the substrate was counted and converted to the count per $mm^2$. The result was 200/$mm^2$.

EXAMPLE 3

Except that the humidity controller was switched OFF and, instead, the spraying chamber was purged with dry nitrogen gas, the spacer was sprayed in otherwise the same manner as Example 1.

Microscopic examination of the substrate sprayed with the spacer as above showed that the spacer had been disposed in the same pattern as in Example 1.

EXAMPLE 4

Except that a prover-like terminal device capable of energizing every two stripe electrodes at two-electrode intervals was prepared and connected to both sides so that voltage could be applied to the individual electrodes in the stripe direction of the ordinary common substrate, the spacer was sprayed in otherwise the same manner as in Example 1.

Microscopic examination of the substrate sprayed with the spacer as above revealed that the spacer had been disposed in the same pattern as in Example 1.

COMPARATIVE EXAMPLE 1

The common electrode for ordinary STN liquid crystal display devices (the conventional common electrode not in the comb-shape) was prepared to the same size as the electrode of Example 1.

The conventional spraying equipment was provided with electrodes and wiring so that a voltage could be applied to the entire ceiling. Then, a DC voltage of −1 kV was applied to the ceiling electrodes and the wires of the common electrode were grounded, whereby lines of electric force were established between the common electrode array and the ceiling. Therefore, when a negatively charged spacer was sprayed, the spacer microparticles could be disposed on the common electrodes (not disposed in electrode gaps).

When the spacer was sprayed in the above condition, the spacer microparticles were disposed without positional selectivity on the whole substrate surface. The reason is probably that because the electrode gap was narrow, the lines of electric force formed were substantially equivalent to a homogeneous electric field over the substrate.

EXAMPLE 5

A liquid crystal display device was constructed using the microparticle spraying apparatus shown in FIG. 7. This microparticle spraying apparatus is equipped with four microparticle delivery ducts 11a varying in constituent material and has a structure such that the spacer can be routed selectively through these four microparticle delivery ducts 11a and sprayed with the aid of compressed air. More particularly, the following spraying modes are used.

On selecting SW 1, the spacer microparticles are sprayed via the Ni duct.

On selecting SW 2, the microparticles are sprayed via the SUS duct.

On selecting SW 3, the microparticles are sprayed via the gold-plated SUS duct.

On selecting SW 4, the microparticles are sprayed via the Al film-clad PVC duct.

A microparticle tank 11b is capable of accommodating two kinds of spacers.

A spraying chamber 10 is provided with a vent hole 14 in its side wall at a level above a stage 15 and this vent hole 14 is opened and closed under timer control after completion of spraying. A humidity controller 13 is also provided so that the interior of the microparticle spraying chamber can be maintained at a constant relative humidity (25° C., 40% RH).

The conductive stage 15 disposed in the lower part of the spraying chamber is adapted to support a glass substrate.

In the common electrode design for STN liquid crystal display devices (color filter substrate, RGB pixel aperture size 80×285 μm, black matrix line width 20 μm, ITO electrode width 290 μm, electrode gap 15 μm, sheet thickness 0.7 mm), a substrate with the stripe electrodes (ITO electrodes) being wired through conductive segments out of the display unit to form a 2:2 comb electrode assembly was fabricated (FIG. 6).

A voltage of +150 V was applied to one of said conductive segments and a voltage of −150 V to the other conductor. In this condition, the synthetic resin microparticle spacer Micropeal BB (particle diameter; 6 μm, Sekisui Fine Chemical Co.) was sprayed. First, SW 1 was selected to perform spraying for 10 seconds. After a settling time of 60 seconds, ventilation was performed for 15 seconds. Then, SW 3 was selected to perform spraying for an additional 10 seconds, followed by 60 seconds of settling and 15 seconds of ventilation in the same manner as above. Finally, the power supply was switched off and the substrate was taken out.

It was found that the spacer was negatively (−) charged by the Ni duct and the spacer was positively (+) charged by the Au-plated SUS duct.

Microscopic examination of the substrate sprayed with the spacer as above revealed that the spacer had been disposed between the adjacent electrodes to which a voltage of +150 V was applied and between the adjacent electrodes to which a voltage of −150 V was applied. Thus, the spacer was disposed under the black matrix.

EXAMPLE 6

Except that SW 1 and SW 4 were selected, spacer spraying was performed in the same manner as in Example 5.

It was found that, the spacer was negatively (−) charged by the Ni duct and the spacer was positively (+) charged by the Al film-lined PVC duct.

Microscopic examination of the substrate sprayed with the spacer as above revealed that the spacer had been disposed between the adjacent electrodes to which a voltage of +150 V was applied and between the adjacent electrodes to which a voltage of −150 V was applied. Thus, the spacer was disposed under the black matrix.

COMPARATIVE EXAMPLE 2

Except that a voltage of +150 V was applied to both conductive segments, i.e. all the electrodes, and SW 1 was selected to perform spraying for 20 seconds, spacer spraying was otherwise performed in the same manner as in Example 5.

As a result, the spacer was uniformly sprayed on the substrate.

This is probably because the ceiling electrodes were distant and the electrode gap was narrow, the lines of electric force were substantially equivalent to a homogeneous electric field so that no positional selectivity was obtained in spraying.

COMPARATIVE EXAMPLE 3

Except that a voltage of −150 V was applied to both conductive segments, i.e. all the electrodes, and SW 1 was selected to perform spraying for 20 seconds, spacer spraying was performed in otherwise the same manner as in Example 5.

As a result, the spacer was distributed uniformly on the substrate, the only difference from Comparative Example 3 being a fewer number of microparticles deposited.

This is probably because the ceiling electrode were distant and the electrode gap was narrow, the lines of electric force were substantially equivalent to a homogeneous electric field so that no positional selectivity was expressed.

EXAMPLE 7

As the spacer microparticles, A: the synthetic resin Micropearl BBP (particle diameter 6 μm, Sekisui Fine Chemical Co.) and B: Micropearl BBP (particle diameter 6 μm) surface-treated with alkyl isocyanate were provided. These spacers were accommodated in independent microparticle tanks and SW 2 was selected to spray both spacers through the same duct in succession in otherwise the same manner as in Example 5.

As a result, A was negatively (−) charged and B positively (+) charged by the SUS duct.

Microscopic examination of the substrate sprayed with the spacer as above revealed that the spacer had been disposed between the adjacent electrodes to which a voltage of +150 V was applied and between the adjacent electrodes to which a voltage of −150 V was applied. Thus, the spacer could be disposed under the black matrix.

EXAMPLE 8

Using the microparticle spraying apparatus illustrated in FIG. 8, a liquid crystal display device was constructed. The spraying chamber of this apparatus has two voltage application terminals connected to the voltage application means 12 so that varying DC voltage may be applied to transparent electrodes on a substrate. The voltage application means 12 is adjustable to the desired voltage value and polarity.

The spraying chamber has a microparticle delivery duct 11a in its upper position so that microparticles 8 can be sprayed by means of compressed air into the spraying chamber. Installed in a lower part of the spraying chamber is a grounded aluminum stage overlayed with an antistatic sheet (volume resistivity $\leq 10^{10}$ Ωcm) on which a substrate is to be placed.

Disposed below the stage is a variable speed fan 16, by which a stream of air can be created within the spraying chamber. In addition, the ceiling of the spraying chamber had a mesh-structure for improved uniformity of air flow.

The rotational speed of the fan 16 was set at 50 rpm (the direction of rotation was to insure a flow of air from the ceiling to the substrate).

In the common electrode design for STN liquid crystal display devices (color filter substrate, RGB pixel aperture size 80×285 μm, black matrix line width 20 μm, ITO electrode width 290 μm, electrode gap 15 μm, sheet thickness 0.7 mm), a substrate board with the stripe electrodes (ITO electrodes) being wired through conductive segments outside of the display unit to form a 2:1 comb electrode assembly was fabricated (FIG. 6). (After spacer spraying, the conductive segments were cut off to provide a common electrode panel of the usual size).

A polyimide alignment film was formed in a thickness of 0.05 μm on the substrate 1 prepared above and subjected to rubbing treatment.

The microparticle delivery duct 11a was a nickel (Ni) duct measuring 3 meters in total length (three 1 m-long ducts connected in series).

Then, the voltage application terminals were connected and a voltage of −2.0 kV was applied to the conductive segment on the 2-electrode side of the 2:1 comb-shaped electrode assembly and a voltage of −2.1 kV to the other conductive segments.

In the above condition, the synthetic resin microparticle Micropearl BBS-6.8 μ-PH (Sekisui Fine Chemical Co.), i.e. microparticle spacer 8, was sprayed (the spacer 8 had been negatively (−) charged).

Microscopic examination of the substrate 1 sprayed with spacer 8 as above revealed that the spacer had been disposed under the black matrix in the electrode gaps on the 2-electrode side of the 2:1 comb-shaped electrode assembly.

EXAMPLE 9

Except that the rotational speed of the fan 16 was set to 500 rpm, the spacer 8 was sprayed under otherwise the same conditions as in Example 8.

Microscopic examination of the substrate 1 sprayed with spacer 8 as above revealed that the spacer had been disposed under the black matrix in the electrode gaps on the 2-electrode side of the 2:1 comb-shaped electrode.

EXAMPLE 10

Except that a voltage of −2.0 kV was applied to the conductive segment on the 2-electrode side of the 2:1 comb-shaped electrode assembly and a voltage of −2.3 kV to the other conductive segment and that a duct comprising a 2 m-long SUS duct and a 1 m-long Ni duct as connected in series was used as the microparticle delivery duct 11a, the spraying of spacer 8 was performed under otherwise the same conditions as in Example 8.

Microscopic examination of the substrate 1 sprayed with spacer 8 as above revealed that the spacer 8 had been disposed under the black matrix in the electrode gaps on the 2-electrode side of the 2:1 comb-shaped electrode.

EXAMPLE 11

Except that a 2 m-long Ni duct was used as the microparticle delivery duct 11a and that a voltage of −2.0 kV was applied to the conductive segment on the 2-electrode side of the 2:1 comb-shaped electrode assembly and a voltage of −2.3 kV to the other conductive segment, the spacer 8 was sprayed under otherwise the same conditions as in Example 8.

Microscopic examination of the substrate 1 sprayed with spacer 8 as above revealed that the spacer 8 had been disposed in the black matrix area in the electrode gap of the 2-electrode side of the 2:1 comb-shaped electrode.

EXAMPLE 12

In the common electrode design for STN liquid crystal display devices, which utilizes a pair of insulating substrates comprising soda glass and each measuring 370×480 mm and 0.7 mm thick, an insulating substrate formed with a color filter layer and an overcoat layer and an insulating substrate having a stripe electrode array consisting of 300 nm-thick ITO electrodes with the electrodes connected outside of the display area to form a 2:1 comb-shaped electrode assembly were prepared (FIG. 10).

An alignment film was formed on each insulating substrate and rubbed. Then, the insulating substrate carrying the color filter layer and overcoat layer was coated with a sealant by screen printing. The sealant contained glass beads which served as the intraseal spacer.

Then, the insulating substrate 1 formed with the stripe electrode pattern 3 was set in the spraying chamber as shown in FIG. 9, and the voltage application terminals were connected so that DC voltage can be independently applied to said conductors.

As spacer 8, the synthetic resin microparticle BBS-60510-PH (Sekisui Fine Chemical Co.) was negatively charged and sprayed.

Thus, as shown in FIG. 11, a DC voltage of −2000 V was applied to display electrodes 3a and a DC voltage of −2080 V to display electrodes 3b to create a potential difference of 80 V between the two groups of display electrodes 3a and 3b. The charged element 19 was charged to the same polarity as spacer 8 to −5000 V.

As a result, the spacer 8 could be disposed exclusively between the display electrodes 3a. The spacer charged to the opposite polarity was deverted away by the force of attraction acting between the spacer and the charged element 19 so that an improved topographic selectivity of spacer disposition was obtained as compared with the absence of the charged element 19.

Then, the pair of insulating substrates 1 were laminated by hot pressing at 180° C. and 0.8 kg/cm and the laminate was after-baked at 150° C. Then, the unwanted parts were cut off. Thus, conductors 20a and 20b were cut off. Thereafter, a liquid crystal 7 was injected to complete a liquid crystal display device comprising said pair of insulating substrates.

INDUSTRIAL APPLICABILITY

The present invention, constituted as above, enables accurate control of microparticle disposition on a substrate. Therefore, the method of manufacturing a liquid crystal display device comprising the use of the microparticle spraying apparatus of the invention accomplishes high-precision disposition of a spacer in the electrode gaps of the transparent stripe electrode array, especially in the manufacture of an STN liquid crystal display device, unlike the conventional random spraying method. As a consequence, the spacer can be disposed selectively under the black matrix to provide a liquid crystal display device featuring a high contrast and free from the incidence of spacer-associated light leaks.

What is claimed is:

1. A spacer particle spraying apparatus for selective disposition of charged spacer particles on a substrate comprising a plurality of electrodes thereon comprising a spraying chamber adapted to accommodate said substrate, a spacer particle supply means for supplying said spacer particles into said spraying chamber and for spraying said spacer particles on said substrate, and a voltage application means for applying voltages to the electrodes disposed on said substrate, wherein said voltage application means is capable of applying different levels of voltage to said electrodes respectively to thereby dispose said spacer particles selectively on a gap between said electrodes.

2. The spacer particle spraying apparatus according claim 1, wherein air is present in the spraying chamber and the spraying chamber is adjustable to accommodate for vertical flow rate of said air therein.

3. The spacer particle spraying apparatus according to claim 1, wherein the spraying chamber is adjustable to compensate for internal humidity or purgeable with dry air.

4. The spacer particle spraying apparatus according to claim 1 wherein the spraying chamber is provided with a stage for setting said substrate and said stage has a volume resistivity of not more than $10^{10}$ Ωcm.

5. The spacer particle spraying apparatus according to claim 1, wherein the spraying chamber internally comprises a charged element.

6. The spacer particle spraying apparatus according to claim 1, wherein the charged element is disposed in at least one domain of a surface extending from a nozzle orifice of the spacer particle supply means to the periphery of the substrate.

7. The spacer particle spraying apparatus according to claim 1, wherein the spacer particle supply means comprises two or more spacer particle delivery ducts and one or more spacer particle tanks, and supplies spacer particles, using a pressurized gas as the vehicle, from said spacer particle tank into the spraying chamber via one of said two or more delivery ducts as selected, and said two or more spacer particle delivery ducts comprise dissimilar constituent materials.

8. The spacer particle spraying apparatus according to claim 1, wherein the spacer particle supply means comprises two or more spacer particle delivery ducts of dissimilar materials as connected in series.

9. The spacer particle spraying apparatus according to claim 7, wherein the spacer particle delivery ducts are adjustable for the relative lengths of component ducts connected in series.

10. The spacer particle spraying apparatus according to claim 1, wherein the spacer particle supply means comprises two or more spacer particle tanks.

11. The spacer particle spraying apparatus according to claim 7, wherein the spacer particle delivery ducts are metal ducts.

12. The spacer particle spraying apparatus according to claim 11, wherein the metal duct is internally covered with either a metal different from the metal constituting said metal duct, or a resin film.

13. The spacer particle apparatus according to claim 7, wherein the spacer particle delivery duct is a resin pipe externally covered with a metal.

14. The spacer particle spraying apparatus according to claim 1, wherein the voltage application means is capable of changing the polarity and level of voltages to be applied to each of said electrodes on the substrate in the course of spraying.

15. A spacer particle spraying method comprising applying different levels of electric potential respectively to a plurality of electrodes on a substrate, charging spacer particles electrostatically, spraying and disposing said spacer particles selectively on said substrate, and further comprising:

eliminating oppositely charged spacer particles, said oppositely charged spacer particles being due to intrinsic variation of the material used in forming said spacer particles, and wherein said charged spacer particles are disposed selectively on a gap between said electrodes.

16. A spacer particle spraying method comprising applying different levels of electric potential respectively to a plurality of electrodes formed on a substrate and charging spacer particles electrostatically, and selectively spraying and disposing said spacer particles on said substrate, wherein a charge member having an electric potential of the same polarity as said spacer particles is located in at least a domain of a surface that extends between a nozzle orifice of a spacer particle delivery nozzle duct and the periphery of said substrate, and wherein said spacer particles are disposed selectively on a gap between said electrodes.

17. The spacer particle spraying method according to claim 16, wherein the potential applied to the charged element is a potential that is higher than the potential to be applied to the electrodes formed on the substrate.

18. A spacer particle spraying method comprising spraying plural kinds of spacer particles constituted by dissimilar constituent materials or surface compositions from respective spacer particle tanks with a pressurized gas as the vehicle using a spacer particle spraying apparatus, wherein said spacer particle spraying apparatus comprises a spraying chamber for accommodating a substrate, a spacer particle supply means comprising at least one spacer particle delivery nozzle duct and at least one spacer particle tank, both for supplying a spacer particle into said spraying chamber and spraying it onto said substrate, and a voltage application means for applying voltages to a plurality of electrodes formed on said substrate, said voltage application means being capable of applying dissimilar levels of voltages to each of said electrodes.

19. The spacer particle spraying method according to claim 18 comprising spraying spacer particles positively charged (+) by routing said spacer particles that are positively charged (+) through one of the spacer particle delivery ducts and negatively (−) charged spacer particles by routing said negatively (−) charged spacer particles through another spacer particle delivery.

20. The spacer particle spraying method according to claim 18, wherein spacer particles of two kinds varying in constituent material or surface composition are positively (+) charged by routing them through a first spacer particle delivery duct and spacer particles of the other kind are negatively (−) charged by routing them through a second spacer particle delivery duct.

21. The spacer particle spraying method according to claim 18, wherein spacer particles are sprayed on an intermittent basis.

22. A method of manufacturing a liquid crystal display device using a spacer particle spraying apparatus, to dispose a spacer selectively on a substrate comprising a striped transparent electrode array constituted by a plurality of linear transparent electrodes arranged in parallel, comprising applying a level (i) of voltage to an even number of linear transparent electrodes arranged in parallel and a level (ii) of voltage to an even number of arranged linear transparent electrodes neighboring said even number of linear transparent electrodes, the level (i) being higher than the level (ii), to thereby produce a region with a potential (+(positive)) (a) and a region with a potential (−(negative)) (b) in an alternate pattern, the potential (a) being higher than the potential (b), and, in this condition, further spraying either positively (+) charged spacer particles constituting a spacer or negatively (−) charged spacer particles constituting a spacer onto said substrate or further spraying positively (+) charged spacer particles constituting a spacer and negatively (−) charged spacer particle s constituting a spacer alternately onto the substrate, wherein the spacer particle spraying apparatus for selective disposition of charged spacer particles on a substrate comprising a plurality of electrodes thereon comprising a spraying chamber adapted to accommodate said substrate, a spacer particle supply means for supplying said spacer particles into said spraying chamber and for spraying said spacer particles on said substrate, and a voltage application means for applying voltages to the electrodes disposed on said substrate, and wherein said voltage application means is capable of applying different levels of voltage to said electrodes respectively to thereby dispose said spacer particles on a gap between electrodes.

* * * * *

UNITED STATES PATENT AND TRADEMARK OFFICE
CERTIFICATE OF CORRECTION

PATENT NO. : 6,649,221 B1
APPLICATION NO. : 09/530223
DATED : November 18, 2003
INVENTOR(S) : Tateno et al.

It is certified that error appears in the above-identified patent and that said Letters Patent is hereby corrected as shown below:

Col. 24, line 42, after "particle" insert -- spraying --.

Col. 26, line 27 "particle s" should read --particles--.

Signed and Sealed this

Fifth Day of December, 2006

JON W. DUDAS
*Director of the United States Patent and Trademark Office*